United States Patent [19]
Takahashi et al.

[11] Patent Number: 4,695,514
[45] Date of Patent: Sep. 22, 1987

[54] MAGNETO-OPTICAL MEMORY ELEMENT

[75] Inventors: Akira Takahashi, Nara; Yoshiteru Murakami; Junji Hirokane, both of Tenri; Hiroyuki Katayama, Nara; Kenji Ohta, Yao, all of Japan

[73] Assignee: Sharp Kabushiki Kaisha, Osaka, Japan

[21] Appl. No.: 675,850

[22] Filed: Nov. 28, 1984

[30] Foreign Application Priority Data

Nov. 29, 1983 [JP] Japan ............................ 58-227293

[51] Int. Cl.$^4$ .............................................. G11B 7/24
[52] U.S. Cl. ................................... 428/432; 428/457; 428/694; 428/704; 428/900
[58] Field of Search ............... 428/692, 694, 900, 704, 428/457, 432; 360/131, 135; 365/122

[56] References Cited

U.S. PATENT DOCUMENTS

| | | | |
|---|---|---|---|
| 4,170,689 | 10/1979 | Katsui et al. | 428/900 |
| 4,390,600 | 6/1983 | Ohta et al. | 428/694 |
| 4,414,650 | 11/1983 | Ohta et al. | 428/694 |
| 4,467,383 | 8/1984 | Ohta et al. | 428/694 |
| 4,489,139 | 12/1984 | Ohta et al. | 428/900 |
| 4,544,443 | 10/1985 | Ohta et al. | 427/131 |
| 4,610,912 | 9/1986 | Takahashi et al. | 428/694 |
| 4,634,617 | 1/1987 | Ohta et al. | |

FOREIGN PATENT DOCUMENTS

| | | |
|---|---|---|
| 084358 | 5/1984 | Japan . |
| 108304 | 6/1984 | Japan . |
| 195809 | 11/1984 | Japan . |

OTHER PUBLICATIONS

Mansuripur et al., IEEE Transactions on Magnetics, vol. MAG—18, No. 6, Nov. 1982, p. 1241.
Cuomo et al., IBM TDB, vol. 16, No. 5, Oct. 1973, p. 1442.
Imamura, N., "Research Applies Magnetic Thin Films and the Magneto Optical Effect in Storage Devices", Journal of Electronic Engineering, Mar. 1983, p. 100.

*Primary Examiner*—George F. Lesmes
*Assistant Examiner*—William M. Atkinson
*Attorney, Agent, or Firm*—Birch, Stewart, Kolasch and Birch

[57] ABSTRACT

A magneto-optical memory element includes a glass substrate and an amorphous Nd-Gd-Fe ternary alloy magnetic recording thin-film having an axis of easy magnetization perpendicular to its surface. The magneto-optical memory element shows a preferable coercive force, a high Kerr rotation angle in the reproduced laser beam, and the Curie temperature suited for a stable operation.

16 Claims, 2 Drawing Figures

MAGNETO-OPTICAL MEMORY ELEMENT

BACKGROUND OF THE INVENTION

1. Field of the Invention

The present invention relates to a magneto-optical memory element, wherein information is recorded into, read out from, or erased from the magneto-optical memory element by applying a laser beam onto the magneto-optical memory element.

2. Description of the Prior Art

Recently, an optical memory system has been developed, which ensures a high density storage, a large capacity storage, and high speed accessing. Especially, a magneto-optical memory element is on the way of the practical application, which includes a magnetic recording film having an axis of easy magnetization perpendicular to its surface. Such a magneto-optical memory element ensures erasing of old information and recording thereto new information. However, the magneto-optical memory element generally shows a low level of a reproduced signal. Especially, when the reproduction system is constructed to utilize the Kerr rotation angle included in the beam reflected from the magneto-optical memory element, the small Kerr rotation angle prevents the enhancement of the S/N ratio.

A polycrystal material such as MnBi or MnCuBi, an amorphous material consisting of rare earth element and transition metal such as GdCo, GdTbFe or TbFe, and a single crystal compound material such as GIG are known as materials suited for the magnetic recording film having an axis of easy magnetization perpendicular to its surface. However, these materials do not show a satisfying S/N ratio in the light beam reflected therefrom. In these materials, the amorphous material consisting of rare earth element and transition metal may be most preferable because the amorphous material ensures a stable fabrication of a large size magnetic recording film. Furthermore, the magnetic recording film made of the amorphous material consisting of rare earth element and transition metal can provide a large coercive force, and ensures a stable writing operation of fine bits. Moreover, in the magnetic recording film made of the amorphous material consisting of rare earth element and transition metal, the Curie temperature can be selected at a desired level.

An idea has been proposed to add cobalt to an alloy consisting of rare earth element and iron in order to increase the magneto-optical effect. For example, when cobalt (Co) is added to the alloy TbFe of rare earth element and iron, the Kerr rotation angle increases from 0.13° (TbFe alone) to 0.28° (TbFe+Co). However, by adding cobalt (Co) to the alloy (TbFe), the Curie temperature increases extremely from 120° C. (TbFe alone) to over 300° C. (TbFe+Co). When the Curie temperature rises, the recording sensitivity is reduced because the writing temperature becomes high.

OBJECTS AND SUMMARY OF THE INVENTION

Objects of the Invention

Accordingly, an object of the present invention is to provide a novel material suited for a magnetic recording film in a magnetio-optical memory element.

Another object of the present invention is to increase the Kerr rotation angle in a magneto-optical memory element without increasing the Curie temperature.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Summary of the Invention

To achieve the above objects, pursuant to an embodiment of the present invention, an amorphous ternary alloy thin-film of Nd-Gd-Fe is used as a magnetic recording film. The Nd-Gd-Fe amorphous thin-film exhibits a preferable coercive force and a large Kerr rotation angle with a relatively low Curie temperature.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

A magneto-optical memory element of the present invention includes a glass substrate 1, and an amorphous alloy thin-film 2 formed on the glass substrate 1 by a sputtering method. The amorphous alloy thin-film 2 functions as a magnetic recording film, and is made of an amorphous ternary alloy Nd-Gd-Fe. The magnetic characteristics and the magneto-optical characteristics of the amorphous Nd-Gd-Fe ternary alloy are shown in the following table when the compositions vary.

|   | alloy composition | $H_C$ | $\theta_K$ | $\theta_K'$ | $T_C$ |
|---|---|---|---|---|---|
| ① | $Nd_4Gd_{24}Fe$ | 1.0 | 0.29° | 0.39° | about 180° C. |
| ② | $Nd_{15}Gd_{24}Fe$ | 0.4 | 0.27° | 0.34° | about 180° C. |
| ③ | $Nd_{15}Gd_{28}Fe$ | 1.4 | 0.25° | 0.35° | about 180° C. |
| ④ | $Nd_{15}Gd_{32}Fe$ | 3.0 | 0.25° | 0.35° | about 180° C. |
| ⑤ | $Nd_{23}Gd_{24}Fe$ | 0.4 | 0.25° | 0.32° | about 180° C. |
| ⑥ | $Nd_{23}Gd_{28}Fe$ | 4.0 | 0.25° | 0.315° | about 180° C. |

In the Table, $H_C$ (KOe or Kilooersted) represents the coercive force, "rectangular shape" represents the rectangular shape condition in the hysteresis loop of the magnetic characteristic, $\theta_K$ shows the Kerr rotation angle measured from the amorphous alloy thin-film 2 side (shown by an arrow A), $\theta_K'$ shows the Kerr rotation angle measured from the glass substrate 1 side (shown by an arrow B), and $T_C$ shows the Curie temperature. The numeral data in the alloy compositions is determined by the number of samples disposed on the target in the sputtering operation. The number of samples generally corresponds to the percentage of the alloy compositions. The amorphous alloy thin-film 2 is formed by the sputtering method under the argon pressure of 10 mtorr.

It will be clear from the Table that the amorphous Nd-Gd-Fe ternary alloy thin-film shows preferable magneto-optical characteristics. Especially, the thin-film ① shows the most preferable characteristics. That is, the coercive force $H_C$ is a proper strength (1 through 2 KOe ensures an easy writing operation and a stable storage of the written data), the hysteresis loop of the magnetic characteristic shows a preferable rectangular shape, and the Kerr rotation angles $\theta_K$ and $\theta_K'$ are sufficiently high to ensure a stable reproduction operation.

Figure 1:
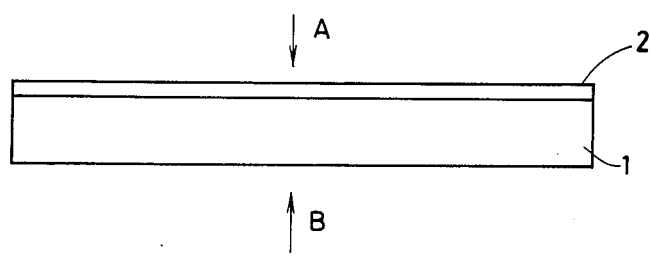
FIG. 1 is a sectional view of an embodiment of a magneto-optical memory element of the present invention.
Figure 2:
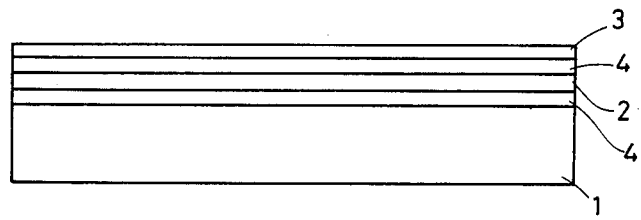
FIG. 2 is a sectional view of another embodiment of a magneto-optical memory element of the present invention.

FIG. 2 shows another embodiment of a magneto-optical memory element of the present invention, which further increases the Kerr rotation angle. Like elements corresponding to those of FIG. 1 are indicated by like numerals. A transparent dielectric film 4 made of, for example, AlN is formed on the glass substrate 1. The amorphous Nd-Gd-Fe ternary alloy thin-film 2 is formed on the transparent dielectric film 4. Another transparent dielectric film 4 is formed on the amorphous Nd-Gd-Fe ternary alloy thin-film 2 so as to sandwich the amorphous Nd-Gd-Fe ternary alloy thin-film 2 by the pair of dielectric films 4 made of, for example, AlN. A reflection film 3 made of, for example, Al is formed on the transparent dielectric film 4. The embodiment of FIG. 2 is effective to enhance the apparent Kerr rotation angle because the Faraday effect in the laser beam transmitting through the amorphous alloy thin-film 2 is combined with the Kerr effect in the laser beam reflected from the surface of the amorphous alloy thin-film 2.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A magneto-optical memory element comprising:
a substrate; and
a recording thin-film having a longitudinal surface formed on said substrate, said recording thin-film having an axis of easy magnetization prependicular to said surface, and said recording thin-film being made of an amorphous Nd-Gd-Fe ternary alloy thin-film.

2. The magneto-optical memory element of claim 1, wherein the film has a coercive force of between 1 and 2 Kilooersteds.

3. The magneto-optical memory element of claim 1, wherein said amorphous Nd-Gd-Fe ternary alloy recording thin-film is an amorphous $Nd_4Gd_{24}Fe$ ternary alloy recording thin-film.

4. The magneto-optical memory element of claim 1, wherein the ternary alloy is selected from the group consisting of $Nd_{15}Gd_{24}Fe$, $Nd_{15}Gd_{28}Fe$, $Nd_{15}Gd_{32}Fe$, $Nd_{23}Gd_{24}Fe$ and $Nd_{23}Gd_{28}Fe$.

5. The magneto-optical memory element of claim 1, wherein the amorphous Nd-Gd-Fe ternary alloy thin-film has a coercive force of between 0.4 and 4.0 KOe.

6. The magneto-optical memory element of claim 1, wherein the amorphous Nd-Gd-Fe ternary alloy thin-film has a Curie temperature of about 180° C.

7. A magneto-optical memory element comprising:
a transparent substrate;
a first transparent dielectric film formed on said transparent substrate;
an amorphous Nd-Gd-Fe ternary alloy recording thin-film having a longitudinal surface and being formed on said first transparent dielectric film;
a second transparent dielectric film formed on said amorphous Nd-Gd-Fe ternary alloy recording thin-film; and
a reflection film formed on said second transparent dielectric film.

8. The magneto-optical memory element of claim 7, wherein the film has a coercive force of between 1 and 2 Kilooersteds.

9. The magneto-optical memory element of claim 7, wherein the dielectric film comprises AlN.

10. The magneto-optical memory element of claim 7, wherein the reflection film comprises aluminum.

11. The magneto-optical memory element of claim 7, wherein the ternary alloy is selected from the group consisting of $Nd_{15}Gd_{24}Fe$, $Nd_{15}Gd_{28}Fe$, $Nd_{15}Gd_{32}Fe$, $Nd_{23}Gd_{24}Fe$ and $Nd_{23}Gd_{28}Fe$.

12. The magneto-optical memory element of claim 7, wherein the amorphous Nd-Gd-Fe ternary alloy thin-film has a coercive force of between 0.4 and 4.0 KOe.

13. The magneto-optical memory element of claim 7, wherein the amorphous Nd-Gd-Fe ternary alloy thin-film has a Curie temperature of about 180° C.

14. The magneto-optical memory element of claim 2, wherein said amorphous Nd-Gd-Fe ternary alloy recording thin-film has an axis of easy magnetization perpendicular to said surface.

15. The magneto-optical memory element of claim 14, wherein said transparent substrate is a glass substrate.

16. The magneto-optical memory element of claim 15, wherein said amorphous Nd-Gd-Fe ternary alloy recording thin-film is an amorphous $Nd_4Gd_{24}Fe$ ternary alloy recording thin-film.

* * * * *

UNITED STATES PATENT AND TRADEMARK OFFICE
CERTIFICATE OF CORRECTION

PATENT NO.  : 4,695,514

DATED       : September 22, 1987

INVENTOR(S) : Akira Takahashi, et al.

It is certified that error appears in the above-identified patent and that said Letters Patent is hereby corrected as shown below:

The term of this patent subsequent to October 1, 2002, has been disclaimed.

Signed and Sealed this

Twenty-second Day of December, 1987

Attest:

DONALD J. QUIGG

Attesting Officer

Commissioner of Patents and Trademarks